United States Patent [19]
Feldman et al.

[11] Patent Number: 6,075,627
[45] Date of Patent: Jun. 13, 2000

[54] DIFFUSING IMAGER AND ASSOCIATED METHODS

[75] Inventors: Michael R. Feldman; W. Hudson Welch, both of Charlotte; Robert Hutchins, Concord, all of N.C.

[73] Assignee: Digital Optics Corporation, Charlotte, N.C.

[21] Appl. No.: 09/296,397

[22] Filed: Apr. 23, 1999

Related U.S. Application Data

[60] Provisional application No. 60/082,938, Apr. 24, 1998.

[51] Int. Cl.[7] .................................................. G03H 1/08
[52] U.S. Cl. ................................. 359/9; 359/15; 359/19
[58] Field of Search .................................. 359/9, 15, 19

[56] References Cited

U.S. PATENT DOCUMENTS

| | | | |
|---|---|---|---|
| 3,604,778 | 9/1971 | Burckhardt | 206/510 |
| 5,608,695 | 3/1997 | Yamazaki . | |
| 5,808,759 | 9/1998 | Okamori et al. | 359/15 |
| 5,815,251 | 9/1998 | Ehbets et al. | 356/5.01 |
| 5,850,300 | 12/1998 | Kathman et al. | 359/9 |

OTHER PUBLICATIONS

Lee, Wai–Hon; "Method For Converting A Gaussian Laser Beam Into A Uniform Beam", Optics Communications Mar. 15, 1981 vol. 36. No. 6, See entire document.

*Primary Examiner*—Cassandra Spyrou
*Assistant Examiner*—Craig Curtis
*Attorney, Agent, or Firm*—Jones Volentine, L.L.P.

[57] ABSTRACT

A diffusing function and a lens function are provided on a single surface. Such a structure may be formed from a computer generated hologram including free form regions having a phase shift associated therewith, i.e., the computer generated hologram being shifted within the free form regions by the phase shift relative to the computer generated hologram outside the free form regions. When the computer generated hologram includes zero and π regions, the zero and π regions may be transposed within the free form regions.

18 Claims, 5 Drawing Sheets

DIFFUSING IMAGER AND ASSOCIATED METHODS

CROSS-REFERENCE TO RELATED APPLICATIONS

This application claims priority under 35 U.S.C. §119(e) to Provisional Application Ser. No. 60/082,938 filed Apr. 24, 1998, which is hereby incorporated by reference it its entirety for all purposes.

BACKGROUND OF THE INVENTION

1. Field of the Invention

The present invention is directed to an optical element having a single surface which both diffuses light and has optical power.

2. Description of Related Art

Diode lasers, LEDs and other light sources produce beams having a nonuniform power distribution. This non-uniformity is often detrimental to performance of a system. It is difficult to achieve uniform power distribution using a conventional lens system. Elements which could be used to re-map the power distribution to one having uniform illumination are desirable for many applications.

It is advantageous to use a diffractive diffuser as shown in FIG. 1, to provide the desired uniform illumination. The diffractive diffuser in FIG. 1 is discussed in detail in U.S. application Ser. No. 08/770,524 entitled "Beam Homogenizer" filed Dec. 20, 1996, which is hereby incorporated by reference in its entirety. In FIG. 1, an incident optical beam 14, preferably a collimated beam, illuminates a diffractive diffusing element 10. The diffractive diffusing element is preferably a computer-generated hologram having irregularly patterned, free-form fringes of diffractive gratings 12. The diffractive fringes 12 of the preferred embodiment are made up of plateaus 16, shown as white areas and presenting a phase shift of zero at the design wavelength to the input beam 14, and vias or valleys 18, shown as black areas and presenting a phase shift of $\pi$ at the design wavelength to the input beam. Such a homogenizer eliminates undesired intensity variations encountered when using a homogenizer having regularly shaped, regularly patterned facets.

The diffractive diffuser 10 transmits transmittal beams 11a, 11b, 11c having a preselected angular spread which provides a beam having uniform illumination at a target 20 in an output plane 22. The output plane 22 represents an area in space rather than any particular element. It would be possible to place another optical element or any device which would make use of the output beam downstream. Any area of sufficient size, i.e., to insure that the full range of line widths present in the pattern, at any position on the diffuser 10 will provide this angular spread to the input beam 14. Each area of sufficient size is nominally uncorrelated to another area of similar size. The choice of angular spread depends upon the application for which the homogenizer is used and the desired output beam.

Often, it is desirable to deflect or focus an image, as well as to diffuse it. However, due to space considerations for some applications, it is not convenient to insert an additional optical element for providing diffuse illumination. Further, there is an additional expense associated with making an additional element.

SUMMARY OF THE INVENTION

The present invention is therefore directed to an optical element, and associated systems and methods, which substantially overcomes one or more of the problems due to the limitations and disadvantages of the related art.

It is therefore an object of the present invention to provide a diffractive diffusing optical element in a single surface which can map non-uniform illumination into more uniform illumination and perform additional optical functions on the input light. The integration of both diffusing and other optical functioning on a single surface provides advantages such as space savings and does not increase the cost over making a diffractive performing only the other optical functions, since no additional surface needs to be made. The surface incorporating the diffusing function is created during the design phase and the resulting element costs the same to manufacture as an optical element without the diffusing function incorporated therein.

At least one of these and other objects may be realized by providing an optical element including a computer generated hologram for performing at least one lens function and at least one diffusing function, the computer generated hologram including free form regions having a phase shift associated therewith, the computer generated hologram being shifted within the free form regions by the phase shift relative to the computer generated hologram outside the free form regions, the computer generated hologram being on a first surface of the optical element.

The computer generated hologram outside the free form regions may include zero regions and $\pi$ regions, the zero regions and $\pi$ regions being transposed within the free form regions. The at least one lens function may include at least one of focusing and deflecting. The optical element may further include features provided on a second surface of the optical element opposite the first surface and aligned with the computer generated holograms. The features may also perform the at least one lens function. The features may include a Fresnel lens. The phase shift may be $\pi$.

At least one of the above and other objects may be realized by providing a method of making a diffractive diffusing lens, including generating a computer hologram pattern in accordance with a desired lens function and a diffusing function, the computer hologram including a plurality of free form regions having a phase shift associated therewith, within the free form regions, the computer hologram is shifted by the phase shift relative to the computer hologram outside the free form regions, and manufacturing the diffractive diffusing lens in accordance with the computer hologram pattern.

The manufacturing may include photolithographic processing. The manufacturing includes injection molding. The generating may include transposing the computer hologram within the free form regions.

At least one of the above and other objects may be realized by providing an optical system including a light source, transmit optics for delivering light from the light source to a target, and return optics for receiving light from the target, wherein at least one of the transmit optics and the return optics includes a diffractive diffusing lens providing diffusion and at least one lens function on a single surface.

The transmit optics and return optics may be integrated on a single substrate. The diffractive diffusing lens may include a computer generated hologram for performing at least one lens function and at least one diffusing function, the computer generated hologram including free form regions having a phase shift associated therewith, the computer generated hologram being shifted within the free form regions by the phase shift relative to the computer generated hologram outside the free form regions, the computer generated hologram being formed on the single surface. The transmit optics may include the diffractive diffusing lens.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limited to the present invention and wherein.

DETAILED DESCRIPTION OF PREFERRED EMBODIMENTS

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. As used herein, the term "lens function" means a function having optical power.

Figure 2:
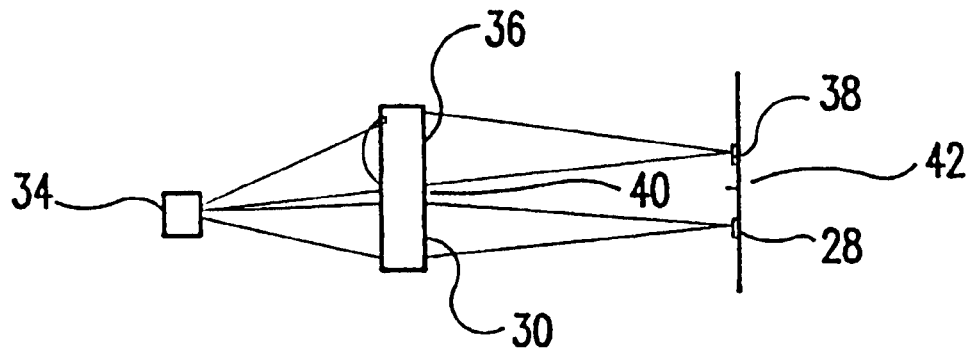
FIG. 2 is a side view of a configuration incorporating a diffractive diffusing optical element of the present invention.

FIG. 2 illustrates a configuration incorporating the optics of the present invention. A light source 28, preferably a light emitting diode, emits light toward a transmit optical apparatus 30. The transmit optical apparatus 30 delivers light to a target 34. Light reflected by the target 34 is delivered to a detector 38 via a return optical apparatus 36.

Preferably, the optical apparatuses 30, 36 are integrated on a common substrate 40, and the light source 28 and the detector 38 are integrated on a common substrate 42. As can be seen in the configuration of FIG. 2, the transmit optical apparatus 30 focuses the light from the light source 28 onto the target 34.

Figure 3A:
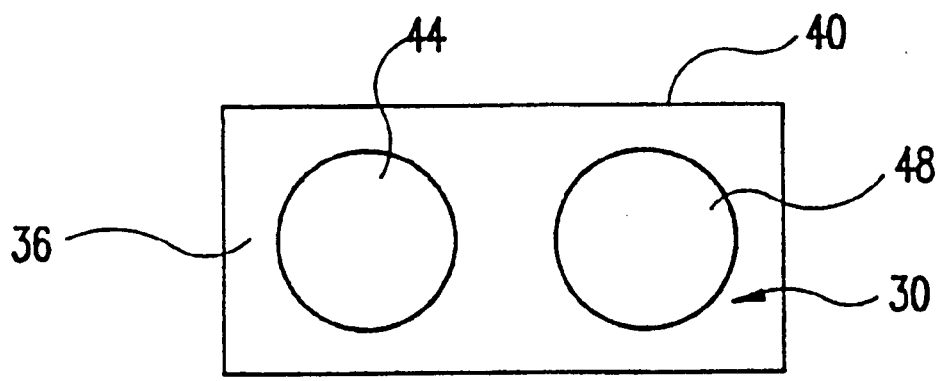
FIG. 3A is a top view of an optical apparatus including the diffractive diffusing lens of the present invention.
Figure 3B:
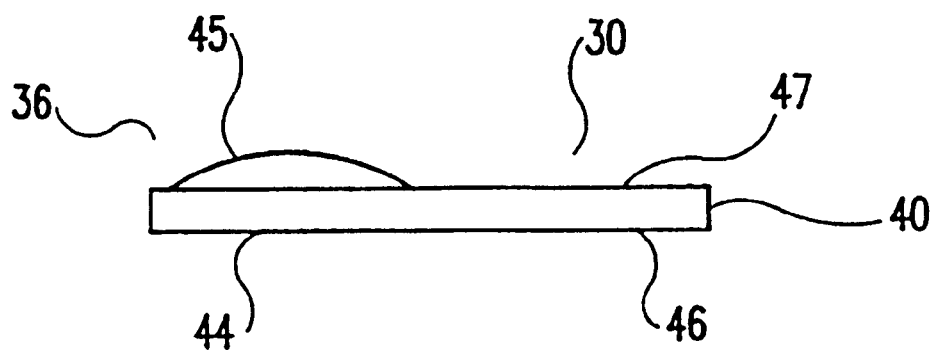
FIG. 3B is a side view of the optical apparatus in FIG. 3A.

Further details of the optics are shown in FIGS. 3A and 3B. The top view in FIG. 3A illustrates the integration of the optical apparatuses 30, 36 onto a single substrate 40. As shown in the side view of FIG. 3B, the return optical apparatus 36 includes a diffractive element 44 on a first surface and a refractive element 45 on a second surface.

As can also be seen in the side view of FIG. 3B, the transmit optical apparatus 30 includes a diffractive element 46 on a first surface thereof and a Fresnel element 47 on a second surface thereof. Both of these elements 46, 47 are needed in the transmit path due to the large deflection angle required in the configuration shown in FIG. 2. Without the use of the diffractive element 46, total internal reflection greatly limits the amount of power that can be directed onto a target. If only the diffractive element 46 is used, the large deflection angle required will result in greatly reduced diffraction efficiency.

A diffusing element is also incorporated into the diffractive element 46 on the first surface. Thus, the diffractive element 46 serves three functions. It will provide approximately half of the required deflection angle. It will aid in focusing light onto the target. It will diffuse and homogenize the light to a more uniform intensity distribution in the illumination region of the target.

Figure 4A:
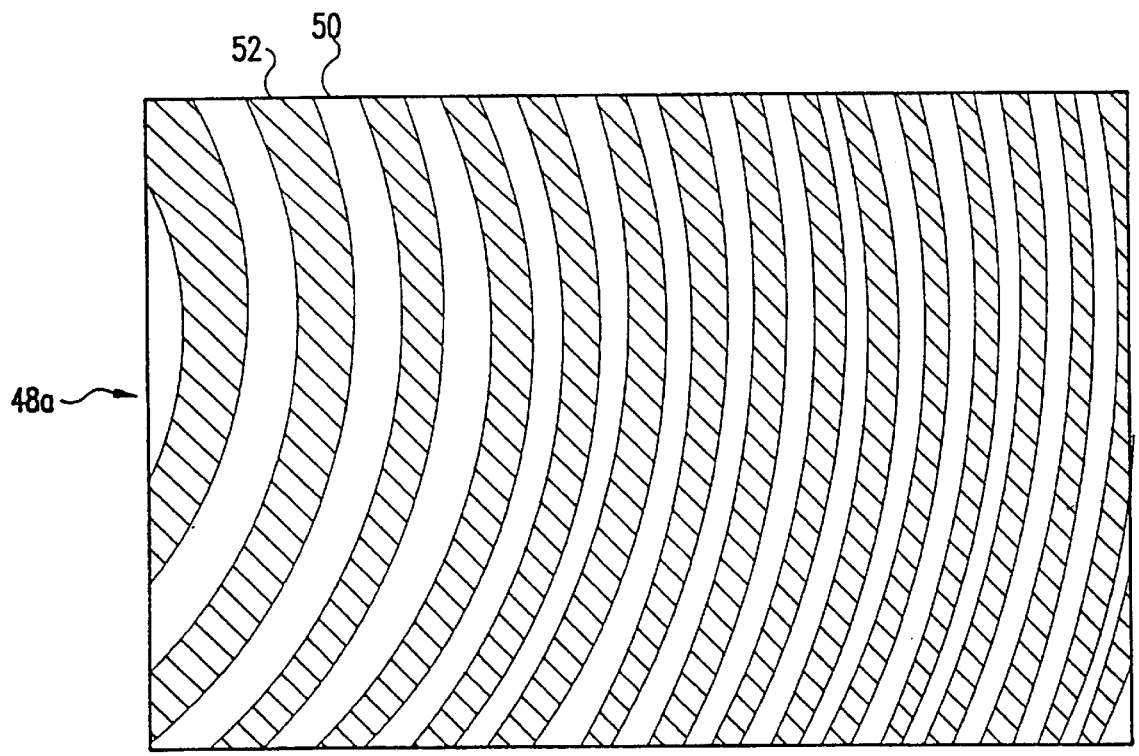
FIG. 4A illustrates fringes of part of a mask for the imager alone.

A binary mask 48a for making a diffractive for performing a lens function is shown in FIG. 4A. Hatched regions 52 present a phase shift of zero and white regions 54 present a phase shift of π to the design wavelength. These regions or fringes respectively correspond to plateaus and vias on the surface itself. In the design shown in FIG. 4A, adjacent hatched or 0 regions and white or π regions have the approximately the same width. If only two levels are desired in the diffractive diffusing lens, then the lens will look like this mask 48. The annular fringes required to create a diffractive for performing the lens functions may be computer generated in a conventional manner.

Figure 1:
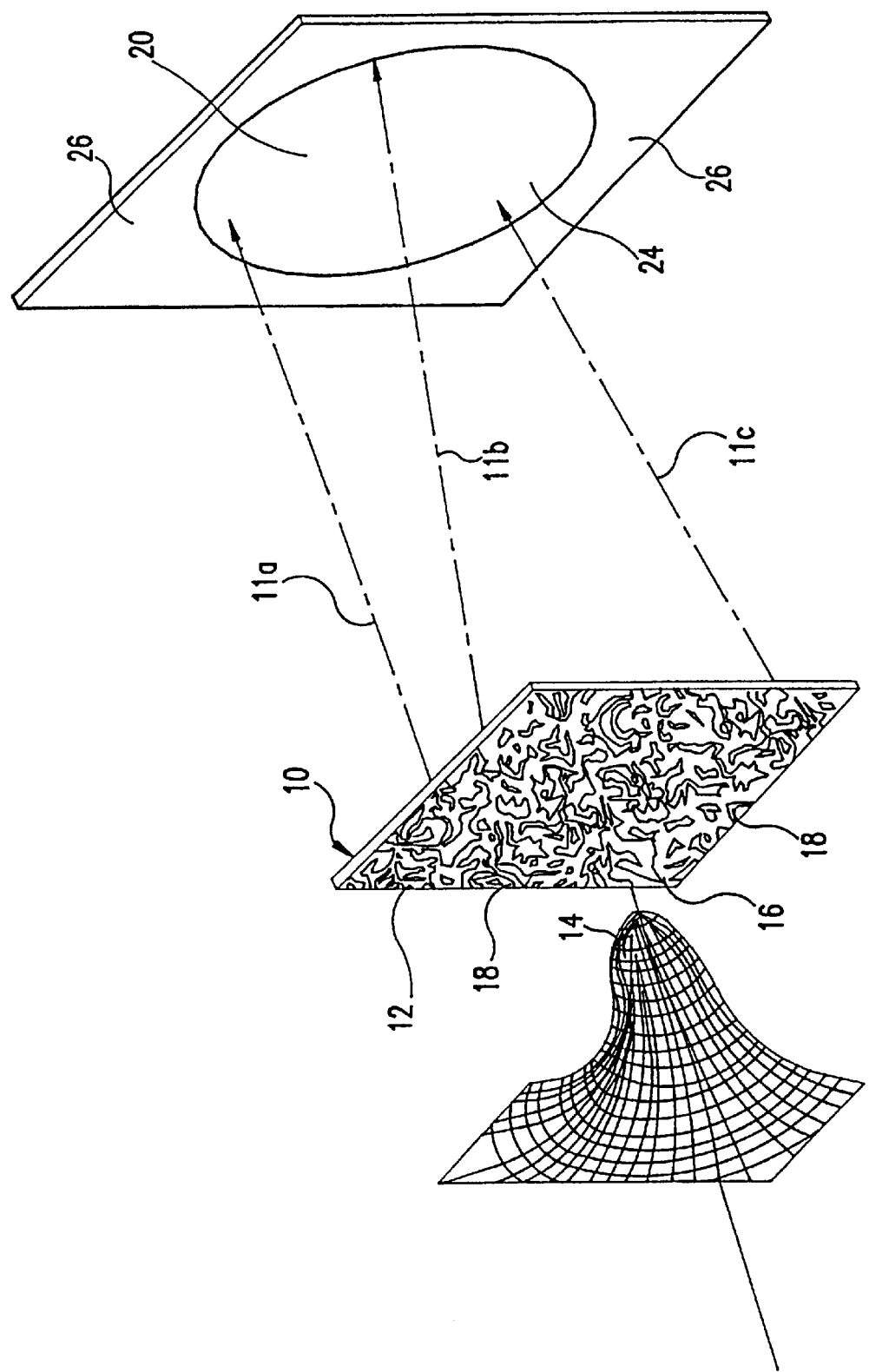
FIG. 1 illustrates the spatial energy distribution of a beam incident upon a homogenizer including free form, irregularly patterned plateaus and vias and the resultant uniform power distribution.
Figure 4B:
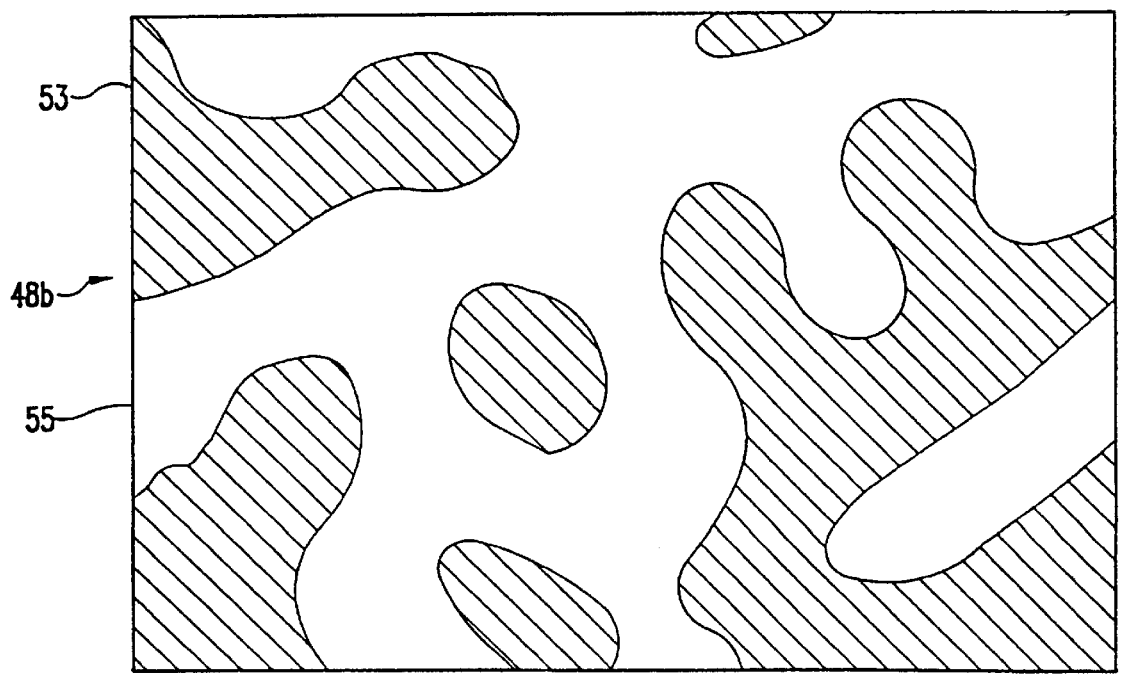
FIG. 4B illustrates fringes of part of a mask for the diffuser alone.

A binary mask 48b for making a diffractive diffuser is shown FIG. 4B. An example of a diffractive diffuser that would be made from such a mask is shown in FIG. 1. The hatched regions 53 present a phase shift of π and the white regions 55 present a phase shift of zero to the design wavelength. These regions or fringes respectively correspond to vias and plateaus on the surface itself. If only two levels are desired in the diffractive diffuser, then the lens will look like this mask 48b. Such a diffuser may be designed as set forth in U.S. application Ser. No. 08/770,524. Generally, these regions may be described as free form regions. The use of free form regions to provide the diffusing function eliminates undesired intensity variations due to sharp edges between the π and 0 regions.

Figure 4C:
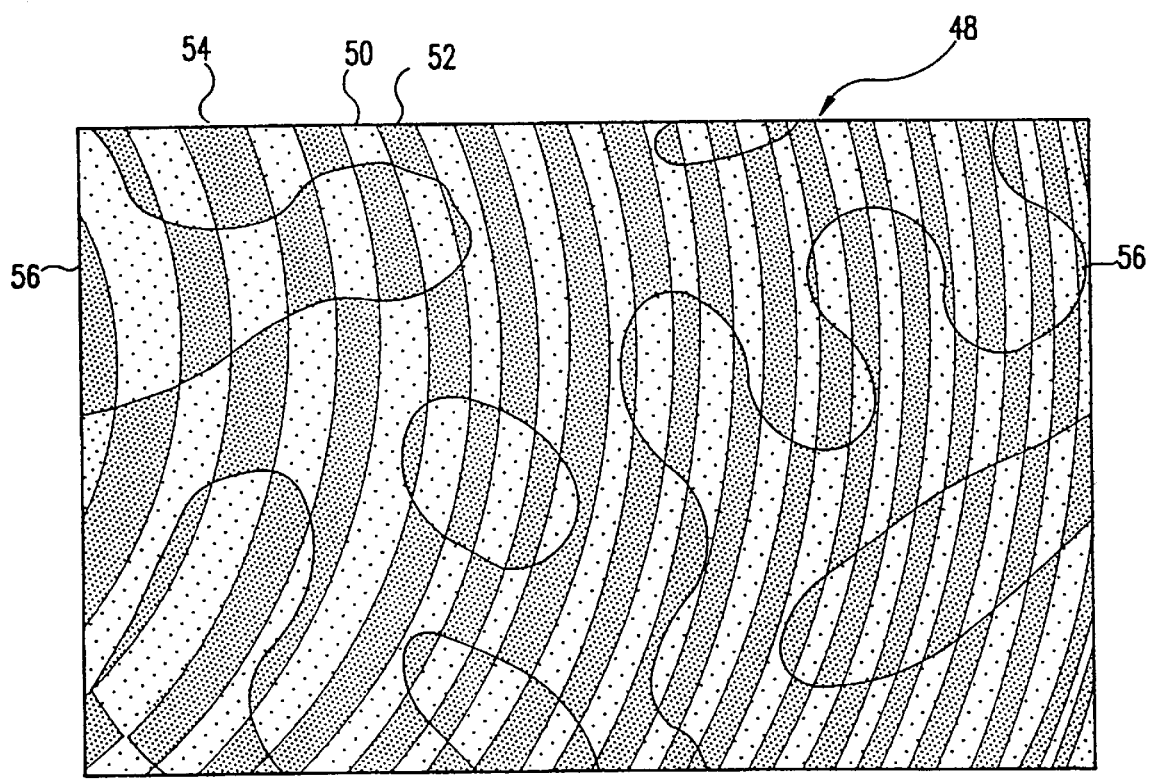
FIG. 4C illustrates fringes of a mask for constructing the diffractive diffusing imager of the present invention.

A binary mask 48c for making a diffractive element 46 incorporating lens functions, such as deflection and focusing, as well as the diffusing function is shown in FIG. 4C. In accordance with the present invention, the diffusing imager may be created by adding the phases of the two functions forming the masks shown in FIGS. 4A and 4B. Such an addition results in shifting the base lens function pattern 54 within the π regions 53, creating shifted regions 56, to form a diffractive diffusing lens on a single surface. In the zero regions 55 of the diffusing mask 48b, the lens function pattern 54 is unaffected. In the specific example of a portion of a mask 48c shown in FIG. 4c, the 0 regions 52 and the π regions 50 within the diffuser π regions 53 are shifted in the resultant shifted regions 56 sufficiently so that they appear transposed from those in the lens function region 54.

The shifting resulting from the incorporation of the diffusing function will result in a slight loss of power from the base lens function, i.e., the point will be slightly blurred. The blur is due to the fact that while a lens maps to a point, the diffuser maps to a region, as described above in connection with FIG. 1. The amount of blur will depend on the design of the diffuser. In order to achieve the diffusing function preferably between approximately 5% and 50% of the surface is encompassed by the shifted regions.

The mask 48c may be used in accordance with U.S. Pat. No. 4,895,790, the entirety of which is hereby incorporated by reference, to create optical elements having plateaus and vias using binary masks. Further, U.S. Pat. No. 5,202,775, which is hereby incorporated by reference in its entirety, discloses a method of fabricating holograms using photolithography and U.S. application Ser. No. 08/381,169, which is hereby incorporated by reference in its entirety, discloses a method of fabricating diffractive elements using injection molding. The mask may thus be used with a variety of methods to form the diffractive diffusing lens in accordance with the present invention.

Figure 5:
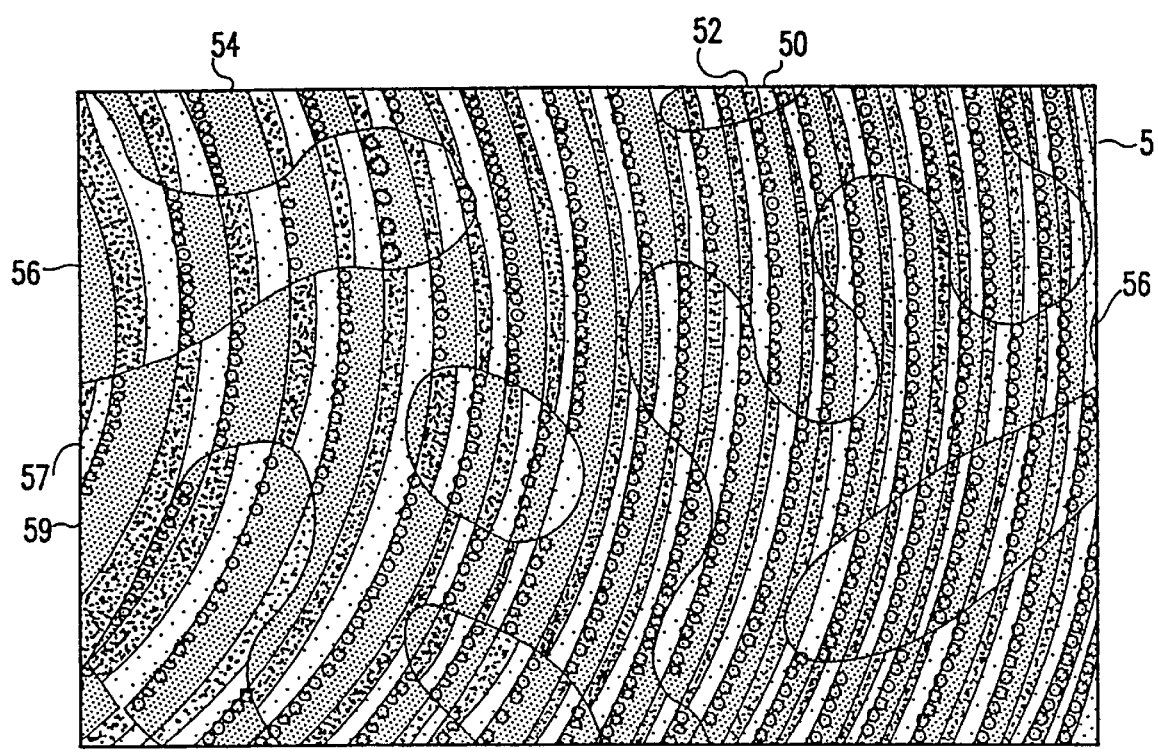
FIG. 5 illustrates fringes of part of the diffractive diffusing imager of the present invention.

An actual diffractive diffusing lens in accordance with the present invention is shown in FIG. 5. The element 58 shown in FIG. 5 can be made using two or three masks, depending on the technique used, and has four levels or regions, the white or $\pi$ region 50, presenting a phase shift of $\pi$, the large dot region 57 presenting a phase shift of $\pi/2$, the black or 0 regions 52, and the small dot region 59 presenting a phase shift of $3\pi/2$. All of the noted phase shifts are at the design wavelength. The $\pi/2$ and $3\pi/2$ regions will actually appear as gray regions, but the dots were used to facilitate visibility. As with the mask 48c, the element 58 has lens function or original regions 54 and shifted regions 56, in which the base lens function pattern is shifted to provide the diffusing function. In the example shown in FIG. 5, the shifting in the free form regions 56 is two levels from the original regions 54.

Each mask used to create the element 58 does not have to have the diffusing function incorporated therein. The element 58 shown in FIG. 5 only had one mask with the diffusing function incorporated with the base lens function, i.e., mask 48c shown in FIG. 4. The other masks were for forming only the base lens function. Preferably, if only one mask has the diffusing function incorporated, it is the mask for the primary or biggest etch.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical element comprising a computer generated hologram for performing at least one lens function and at least one diffusing function, said computer generated hologram including free form regions, each free form region having a plurality of phase regions, the computer generated hologram being shifted within said free form regions by a phase shift relative to the computer generated hologram outside said free form regions, said computer generated hologram being on a first surface of the optical element.

2. The optical element according to claim 1, wherein the computer generated hologram comprises zero regions and $\pi$ regions, zero regions and $\pi$ regions being transposed within said free form regions relative to zero regions and $\pi$ regions outside said free form regions.

3. The optical element according to claim 1, wherein said at least one lens function includes at least one of focusing and deflecting.

4. The optical element according to claim 1, further comprising features provided on a second surface of the optical element opposite the first surface and aligned with the computer generated hologram.

5. The optical element according to claim 4, wherein the features also perform said at least one lens function.

6. The optical element according to claim 4, wherein the features include a Fresnel lens.

7. The optical element according to claim 1, wherein the phase shift is $\pi$.

8. A method of making a diffractive diffusing lens, comprising:

generating a computer generated hologram pattern in accordance with a desired lens function and a diffusing function, the computer generated hologram pattern including a plurality of free form regions, each free form region having a plurality of phase regions and being shifted by a phase shift relative to the computer generated hologram pattern outside said free form regions, the computer generated hologram pattern outside said free form regions having phase structure; and manufacturing the diffractive diffusing lens in accordance with said computer generated hologram pattern.

9. The method according to claim 8, wherein said manufacturing includes photolithographic processing.

10. The method according to claim 8, wherein said manufacturing includes injection molding.

11. The method according to claim 8, wherein said generating includes transposing said computer generated hologram pattern within said free form regions.

12. An optical system comprising:

a light source;

transmit optics for delivering light from the light source to a target; and return optics for receiving light from the target, wherein at least one of the transmit optics and the return optics includes a diffractive diffusing lens providing at least one lens function and at least one diffusing function, said computer generated hologram including free form regions, each free form region having a plurality of phase regions, the computer generated hologram being shifted within said free form regions by a phase shift relative to the computer generated hologram outside said free form regions, said computer generated hologram being on a single surface.

13. The optical system according to claim 12, wherein the transmit optics and return optics are integrated on a single substrate.

14. The optical system according to claim 12, wherein the transmit optics include the diffractive diffusing lens.

15. The method according to claim 8, wherein, when said manufacturing of the diffractive diffusing lens requires more than one mask, at least one mask has the diffusing function incorporated therein.

16. The method according to claim 8, wherein, when said manufacturing of the diffractive diffusing lens requires more than one mask, only one mask has the diffusing function incorporated therein.

17. The optical element of claim 1, wherein said plurality of phase regions in each free form region has a pattern corresponding to a pattern for the at least one lens function.

18. The optical element of claim 8, wherein said plurality of phase regions in each free form region has a pattern corresponding to a pattern for the desired lens function.

* * * * *